United States Patent [19]
Borer et al.

[11] 3,962,246
[45] June 8, 1976

[54] BROMO-PROPANOL DERIVATIVES AS FLAME RETARDANTS

[75] Inventors: Peter Borer, Basel; Hans-Werner Finck; Horst Mayerhoefer, both of Oberwil; Urs Sollberger, Fullinsdorf; Wolfgang Heinz Mueller, Neuallschwil, all of Switzerland

[73] Assignee: Sandoz Ltd., Basel, Switzerland

[22] Filed: July 19, 1974

[21] Appl. No.: 490,124

[30] Foreign Application Priority Data
July 25, 1973 Switzerland............ 10838/73

[52] U.S. Cl. .................. 260/268 C; 260/247.2 B; 260/293.63; 260/326.4; 260/471 C; 260/482 B; 260/45.8 N; 260/45.8 NZ; 260/482 C
[51] Int. Cl.² ......................... C07D 295/18
[58] Field of Search .................. 260/268 C

[56] References Cited
FOREIGN PATENTS OR APPLICATIONS
1,821M 5/1963 France
1,595,474 8/1969 Germany Primary Examiner—Raymond V. Rush
Assistant Examiner—Jose Tovar
Attorney, Agent, or Firm—Gerald D. Sharkin; Richard E. Vila; Joseph J. Borovian

[57] ABSTRACT

The present invention concerns a novel method of flame-proofing flammable material which comprises treating said material with a compound of the formula:

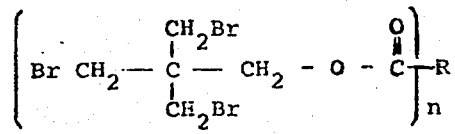

wherein $n$ is 1 or 2, and R, when $n$ is 1, is a radical of the formula

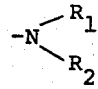

wherein $R_1$ and $R_2$ are substituents e.g. alkyl, or $R_1$ and $R_2$, together with the nitrogen atom, form a heterocyclic ring or R, when $n$ is 2, is a radical of the formula

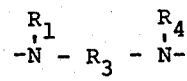

wherein $R_1$ and $R_4$ are substituents e.g. alkyl and $R_3$ is a hydrocarbon bridge e.g. alkylene, or $R_1$, $R_2$ and $R_4$, together with the nitrogen atoms to which they are bound, form a heterocyclic ring, or a group of the formula

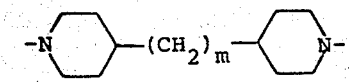

wherein $m$ is 1 to 5, and novel compounds (i.e. when $n$ is 2) useful as flame-proofing agents.

1 Claim, No Drawings

BROMO-PROPANOL DERIVATIVES AS FLAME RETARDANTS

The present invention relates to bromo-propanol derivatives possessing flame retarding properties.

Accordingly, the present invention provides a method of flame-proofing flammable material which comprises treating said material with a compound of formula I,

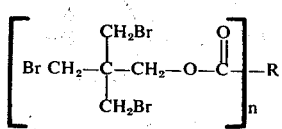   I wherein
n is 1 or 2, and
R, when n is 1, is a radical of the formula

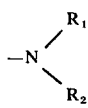

wherein
R₁ is alkyl ($C_1$–$C_5$), alkenyl($C_2$–$C_5$), phenylalkyl ($C_7$–$C_9$), phenyl, naphthyl, phenylsulphonyl, or phenylalkyl ($C_7$–$C_9$), phenyl, naphthyl or phenylsulphonyl substituted on the aromatic nucleus thereof by 1 cyano, 1 nitro, 1 to 5 chlorine, 1 to 3 bromine and/or 1 or 2 alkyl ($C_1$–$C_4$) substituents, and R₂ is alkyl ($C_1$–$C_5$), alkenyl($C_2$–$C_5$), phenylalkyl ($C_7$–$C_9$), phenyl, or phenylalkyl ($C_7$–$C_9$) or phenyl substituted on the phenyl nucleus thereof by 1 cyano, 1 nitro, 1 to 5 chlorine, 1 to 3 bromine and/or 1 or 2 alkyl ($C_1$–$C_4$) substituents or R₁ and R₂, together with the nitrogen atom, form a saturated or unsaturated 5 to 8 membered nitrogen containing heterocyclic ring which may include oxygen or sulphur as a further hetero atom, the molecule having no more than 5 aromatically bound chlorine or 3 aromatically bound bromine atoms in the aggregate thereof,
or R, when n is 2, is a radical of the formula

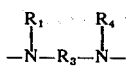

wherein
R₁ is as defined above,
R₃ is alkylene ($C_1$–$C_{12}$) unsubstituted or substituted by 1 to 4 halogen atoms, alkylenephenylenealkylene ($C_8$–$C_{10}$), phenylene, naphthylene, diphenylene, or alkylenephenylenealkylene($C_8$–$C_{10}$) or phenylene substituted on the aromatic nucleus thereof by 1 or 2 chlorine or bromine atoms or 1 or 2 alkyl ($C_1$–$C_4$) or haloalkyl ($C_1$–$C_4$) groups, with the proviso that when R₃ is substituted phenylene R₁ is alkyl,
R₄ has one of the significances of R₁ or
R₁, R₃ and R₄, together with the nitrogen atoms to which they are bound, form a saturated or unsaturated 5 to 8 membered nitrogen containing heterocyclic ring, or a group of the formula

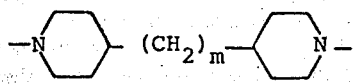

wherein m is 1 to 5.

If not otherwise stated, alkyl or alkenyl radicals may be natural or synthetic primary, secondary or tertiary straight-chain or branched radicals. Examples of primary radicals are methyl, ethyl, propyl, butyl, pentyl and allyl.

Examples of secondary alkyl radicals are isopropyl and 2-butyl.

Examples of tertiary alkyl radicals are tertiary butyl and 2-methyl-2-butyl.

Examples of alkylene radicals which are substituted by halogen are —CHCl—CHCl— and —CH₂—C(CH₂Br)₂—CH₂—.

Examples of aralkyl radicals are benzyl and 2-phenylethyl.

Halogen as employed herein means fluorine, chlorine and bromine and is preferably chlorine or bromine.

Examples of substituted phenylalkyl, phenyl, naphthyl or phenylsulphonyl radicals are: 4-nitrobenzyl, 4-bromobenzyl, 3,4-dibromobenzyl, 3,4-dichlorobenzyl, 2-, 6-, 4-chlorobenzyl, 2,4-dibromobenzyl, 2,4-dichlorobenzyl, 2,4,5-tribromophenylsulphonyl, 2,4,5-trichlorophenylsulphonyl, 2,4-dichloronaphthyl and 1,6-dibromo-2-naphthyl. Examples of alkylenephenylenealkylene radicals are: 2-bromo-1,4-xylylene, 4- or 6-bromo-1,3-xylylene, 2-chloro-1,4-xylylene, 2,5-dibromo-1,4-xylylene and 2,5-dichloro-1,4-xylylene. Examples of unsubstituted and substituted arylene radicals are: 2-bromophenylene, 2,5-dibromophenylene, 2-chlorophenylene, 2,5-dichlorophenylene and 2,5-dimethylphenylene, preferably the para-phenylene radicals.

For n = 2, the radical R preferably has at most 6 chlorine atoms or 4 bromine atoms, or if both chlorine and bromine atoms are present at the same time, at the most 5 halogen atoms, more preferably 4 chlorine or 2 bromine atoms or less, or at the most 3 halogen atoms when both chlorine and bromine are present.

Preferred compounds of formula I in the method of the invention are the compounds of formula Ia,

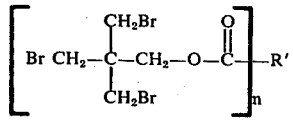   Ia wherein
n is as defined above and
R', when n is 1, is a group

wherein
R₁' and R₂' are each independently alkyl ($C_1$–$C_4$), benzyl, phenyl or benzyl or phenyl substituted on the phenyl nucleus thereof by 1 to 3 chlorine and/or 1 or 2 bromine atoms, the molecule having no more than 5 aromatically bound chlorine or 2 aromatically bound bromine atoms in the aggregate thereof, or $R_1'$ and $R_2'$, together with the nitrogen atom to which they are bound from a piperidine morpholine, pyrrole, pyrroline or pyrrolidine ring and $R'$, when n is 2, is a group $$-\underset{R_1'}{\underset{|}{N}}-R_3'-\underset{R_4'}{\underset{|}{N}}-$$

wherein $R_1'$ is as defined above, $R_3'$ is alkylene ($C_1$–$C_6$), phenylene or phenylene substituted by 1 or 2 chlorine or bromine or 1 or 2 alkyl ($C_1$–$C_4$) groups with the proviso that when $R_3'$ is substituted phenylene $R_1'$ is alkyl, and $R_4'$ has one of the significances of $R_1'$, or $R_1'$, $R_3'$ and $R_4'$, together with the nitrogen atoms to which they are bound form a group $$-N\underset{\diagdown}{\diagup}\underset{\diagup}{\diagdown}N-$$

or $$-N\underset{\diagdown}{\diagup}\underset{\diagup}{\diagdown}-(CH_2)_3-\underset{\diagdown}{\diagup}\underset{\diagup}{\diagdown}N-$$

Further preferred compounds of formula I in the method of the invention are the compounds of formula Ib, $$\left[BrCH_2-\underset{\underset{CH_2Br}{|}}{\overset{\overset{CH_2Br}{|}}{C}}-CH_2-O-\overset{\overset{O}{\|}}{C}\right]_n-R''  \quad\text{Ib}$$

wherein $n$ is as defined above and $R''$, when $n$ is 1, is a group of the formula $$-N\underset{\diagdown R_2''}{\diagup R_1''}$$

wherein $R_1''$ is alkyl ($C_1$–$C_4$) or phenyl and $R_2''$ is alkyl ($C_1$–$C_4$)

or $R_1''$ and $R_2''$, together with the nitrogen atom to which they are bound form a piperidine, morpholine or pyrrolidine ring, and $R''$, when $n$ is 2, is a group of the formula $$-\underset{R_1''}{\underset{|}{N}}-R_3''-\underset{R_4''}{\underset{|}{N}}-$$

wherein $R_1''$ is as defined above, $R_3''$ is alkylene ($C_1$–$C_4$) or phenylene, $R_4''$ has one of the significances of $R_1''$ or $R_1''$, $R_3''$ and $R_4''$, together with the nitrogen atoms to which they are bound, form a group $$-N\underset{\diagdown}{\diagup}\underset{\diagup}{\diagdown}N-$$

or $$-N\underset{\diagdown}{\diagup}\underset{\diagup}{\diagdown}-(CH_2)_3-\underset{\diagdown}{\diagup}\underset{\diagup}{\diagdown}N-$$

A particularly preferred group of compounds in the method of the invention are the compounds of formula Ic, $$\left[BrCH_2-\underset{\underset{CH_2Br}{|}}{\overset{\overset{CH_2Br}{|}}{C}}-CH_2-O-\overset{\overset{O}{\|}}{C}\right]_n-R'''  \quad\text{Ic}$$

wherein $n$ is as defined above and $R'''$, when $n$ is 1, is a group of the formula $$-N\underset{\diagdown R_2'''}{\diagup R_1'''}$$

wherein $R_1'''$ is methyl or phenyl, and $R_2'''$ is methyl and $R'''$, when $n$ is 2, is a group of the formula $$-\underset{R_1'''}{\underset{|}{N}}-R_3'''-\underset{R_4'''}{\underset{|}{N}}-$$

wherein $R_1'''$ and $R_4'''$ are each independently methyl or phenyl and $R_3'''$ is alkyl ($C_1$–$C_4$)

or $R_1'''$, $R_3'''$ and $R_4'''$ together with the nitrogen atoms to which they are bound form a group $$-N\underset{\diagdown}{\diagup}\underset{\diagup}{\diagdown}N-$$

The compounds of formula I, Ia, Ib and Ic, wherein $n$ is 2, i.e. compounds falling under the formula I', $$\left[BrCH_2-\underset{\underset{CH_2Br}{|}}{\overset{\overset{CH_2Br}{|}}{C}}-CH_2-O-\overset{\overset{O}{\|}}{C}\right]_2-R \quad\text{I'}$$

wherein R is as defined above, are new and also form part of the present invention.

The compounds of formula I' may, in accordance with a further aspect of the present invention, be produced by condensing a compound of formula II,

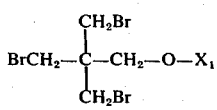     II wherein $X_1$ is H or a radical

with a compound of formula III,

     III wherein
R is as defined above for the case where $n$ is 2 and both $X_2$ significances are the same and are each either H or a radical

with the proviso that (a) $X_1$ of formula II is different to each $X_2$ of formula III and (b) when R is piperazine then $X_2$ is hydrogen.

The reaction conditions in the process of the invention are not critical. Preferably, the compounds of formulae II and III are reacted in a molar ratio of 2 : 1. Preferably, also the reaction is effected in an organic solvent inert under the conditions employed. Examples of suitable solvents are benzene, toluene, cymene, diphenyl ether, tetrahydrofuran, dioxane, trichloroethylene, chlorobenzene or petroleum ether. Preferably, the reaction is effected in the presence of an acid acceptor, being more basic than the compound of formula III. Examples of suitable acid acceptors are triethylamine or pyridine. Preferably the reaction is initially maintained at a temperature of from 10° to 30°C followed by heating to between 40°C and the reflux temperature, preferably to between 40° and 50°C, towards the end of the reaction.

The compounds of formula I wherein $n$ is 1 are either known, or may be produced in analogous manner to the above described process for compounds wherein n is 2, preferably reacting the starting materials in an equimolar ratio.

The compounds of formulae II and III are either known or may be produced in known manner. Thus, the compounds of formulae II and III wherein $X_1$ and $X_2$ are

may be produced by reacting a compound of formula:

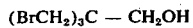

or a compound of formula

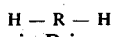

wherein R is as defined above in the case where $n$ is 2, with phosgene.

The compounds of formula I, as mentioned above, are useful in flame-proofing inflammable organic material by a method comprising treating the organic material with a compound of formula I. By the term "treating" is meant either surface coating or incorporation into the body of the organic material, in manner known per se.

The method of the invention preferably comprises treating the organic material, by way of mixing the compound of formula I with the organic material, so as to uniformly distribute the compound of formula I throughout the body of the organic material. Thus, according to a first embodiment the method may be effected by intimately mixing the compound with a particulate or molten form of, for example, a plastics material such as polypropylene, e.g. polypropylene granules, in a kneader or other suitable device, to obtain uniform distribution of the stabilizer throughout the plastics material. The plastics material may thereafter be formed into final shape, e.g. by extrusion or injection moulding. By such method, homogeneous distribution of the stabilizer throughout the plastics material is achieved which is important for good protection.

According to the second embodiment of the method of the present invention, particularly suited to stabilization of polymers or copolymers, e.g. polyurethanes or polyester, the compound is mixed with the monomer or prepolymer before polymerisation or, as the case may be, copolymerisation, is effected, to yield the polymer or copolymer having the stabilizer uniformly distributed therethrough. The polymer or copolymer may thereafter be extruded, moulded or otherwise formed into final shape.

The compounds are particularly useful for the treatment of synthetic plastics materials. Examples of suitable organic materials appropriate for this treatment are: polyolefines, notably, polyethylene and polypropylene, polyesters, polymethyl methacrylates, polyphenylene oxides, polyurethanes, polystyrene, copolymers such as acrylonitrile-butadiene-styrene (ABS) terpolymer, polyamides such as nylon, polypropylene oxide, polyacrylonitrile and corresponding copolymers.

The compounds according to the invention are preferably used for the stabilization of polypropylene, polyethylene, polyester, polyamide, polyurethanes, polyacrylonitrile, copolymers such as acrylonitrile-butadiene-styrene (ABS) terpolymer, acrylicester-styrene-acrylonitrile terpolymer, styrene-acrylonitrile copolymer or styrene-butadiene copolymer.

Stabilized organic materials according to the invention may exist in solid form, e.g. panels, rods, coatings, sheets, films, tapes, fibres, granules or powders, or in liquor form, e.g. solutions, emulsions or dispersions.

The compounds of formula I possess notable thermostability. They are therefore particularly suited to incorporation into polymer melts such as polypropylene or polyester melts for extrusion or injection moulding into final shape, where temperatures typically of up to 300°C are encountered. In this manner, flame-proofed injection moulded, spun or otherwise extruded materials and split fibres may be produced. The compounds also possess notable fastness to migration when incorporated into synthetic polymeric materials.

The amount of stabilizer employed in the method of the present invention will of course vary with the mode of application, the compound employed and the nature of the organic material to be treated. In general, however, satisfactory results are obtained when the amount of stabilizer employed is between 1 and 40 %, preferably between 2 and 10 %, especially between 2 and 6 % of the weight of organic material to be treated.

The compounds of formula I possess notably good flame retardant properties when admixed with antimony trioxide. The present invention therefore further provides a flame proofing composition comprising a compound of formula I in association with antimony trioxide, e.g. in a weight ratio 4 : 1 to 4, more preferably 5 : 2 to 3, especially 2 : 1 respectively.

In the following Examples the parts and percentages are by weight and the temperatures in degree Centigrade. The indicated structures are verified by microanalysis and spectroscopic analysis.

EXAMPLE 1 a. 96 parts of phosgene are entered into 900 parts of absolute toluene at −10° to −15°C. A solution of 228 parts of 2,2-bis-bromomethyl-3-bromopropanol and 70 parts of absolute triethylamine in 300 parts of absolute toluene is added dropwise to this over the course of 2 hours at −5° to −10°C. Then, nitrogen is passed through the mixture so as to expel the excess phosgene. The triethylamine hydrochloride is filtered off, is washed twice with 50 parts of toluene, the filtrate is freed from toluene on a rotary evaporator and the residue is distilled at high vacuum.

Chlorocarbonic acid-2,2-bis-bromomethyl-3-bromopropylester having a boiling point of 117° to 119°C is obtained.

b. 39 parts of chlorocarbonic acid-2,2-bis-bromomethyl-3-bromopropylester, dissolved in 90 parts of absolute benzene are introduced to a nitrogen atmosphere. A solution of 4,4 parts of N,N′-dimethylethylenediamine, 12 parts of pyridine and 30 parts of absolute benzene is added dropwise with stirring at 10° to 20°C. Stirring is continued at room temperature for a further 10 hours. Then, the resultant precipitate is filtered off, washed with 50 parts of absolute benzene, then twice with 100 parts of water and finally with 50 parts of acetone. The remaining solid is recrystallized from ethanol. The compound of formula

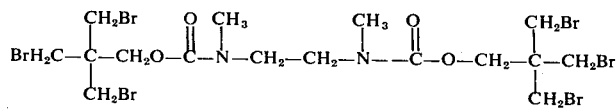

having a melting point of 110° to 111°C is obtained.

EXAMPLE 2

28 parts of phosgene are dissolved under nitrogen in 150 parts of absolute toluene at −5° to −10°C. A solution of 65 parts of 2,2-bis-bromomethyl-3-bromopropanol, 20.2 parts of triethylamine and 86 parts of toluene is added dropwise to this solution at −5° to −10°C with stirring, over the course of 1 hour. The mixture is then heated to 40°C, nitrogen being passed through simultaneously, so as to remove excess phosgene. Then 8.6 parts of piperazine are added at 20°C and 20.2 parts of triethylamine are added after 1 hour over the course of 10 minutes. After the mixture has been stirred for a further 1.5 hours at 40°C, it is cooled to room temperature. The solid is filtered off, washed 3 times with 50 parts of toluene, then 6 times with 50 parts of water and finally with 50 parts of acetone. Subsequently, it is recrystallized from benzene. The compound of formula

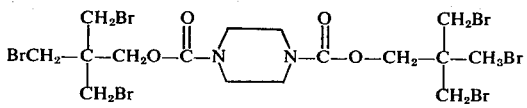

having a melting point of 211° to 212°C is obtained.

In a similar manner, the following compounds are produced:

Example 3: 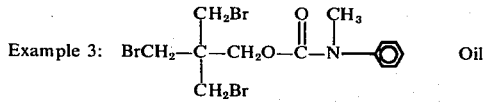 Oil

Example 4: 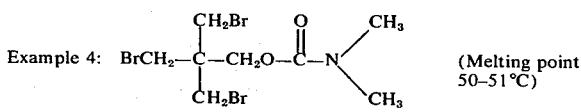 (Melting point 50–51°C)

Example 5: 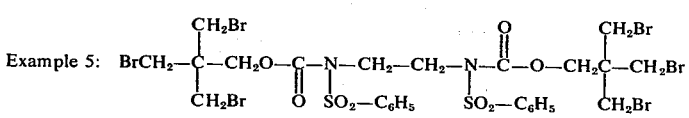

APPLICATION EXAMPLE 6

The compound of Example 2 mixed with antimony trioxide (2:1) is mixed well on a shaking machine with polypropylene powder (commercially available under the Trade Mark "Propathene HM 20" from ICI Ltd. United Kingdom), which is stabilised with 0.1% of an antioxidant (commercially available under the Trade Mark "Irganox 1010" sold by Ciba-Geigy AG Switzerland), and it is processed on a roller mill for 5 minutes at a roller temperature of 165° to 175°C to form a so-called skin which is pressed at 220°C (1.5 minutes at 1.5 t, 1.5 minutes at 30 t).

In analogous manner, polypropylene sheet, treated with the compounds of Examples 1, 3 and 4 may be produced.

The degree of flame-proofing may be established by determining the "limiting oxygen index" [Fenimore and Martin, Modern Plastics, Vol. 44 No. 3, page 141 (1966)-ASTMD 2863 variant]. Essentially, the determination comprises supporting a specimen of the sheet vertically in a sealed chamber which is provided with an oxygen/nitrogen gas mixture inlet and also a burner for providing an open flame to which the specimen may be exposed. The oxygen content of the oxygen/nitrogen gas mixture is variable. The proportion of oxygen is varied and the amount at which no further propagation of burning of the sheet after exposure to the open flame is measured and yields the "limiting oxygen index". An index greater than the proportion of oxygen generally present in the atmosphere represents a flame proofing action.

Alternatively, the degree of flame-proofing may be determined in accordance with German flammability test DIN 53,438. Essentially, this determination comprises supporting a specimen of the sheet vertically in a chamber and exposing the sheet to a naked flame under controlled conditions, for a period of 15 seconds. After removal of the flame, the period of further burning, and the length of burnt area is determined and compared with an untreated sheet.

What is claimed is:
1. A compound of the formula:

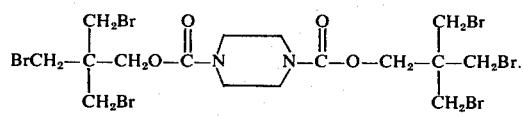

* * * * *